United States Patent [19]

Ontiveros et al.

[11] Patent Number: 5,105,544
[45] Date of Patent: Apr. 21, 1992

[54] GEOGRAPHICAL LOCATION PINPOINTER

[76] Inventors: Othon Ontiveros; Terry A. Ontiveros, both of 1453 Francesca Dr., El Paso, Tex. 79936

[21] Appl. No.: 761,255

[22] Filed: Sep. 17, 1991

[51] Int. Cl.$^5$ ............................................. G09B 29/10
[52] U.S. Cl. ..................................... 33/1 SD; 33/431; 434/153
[58] Field of Search ................. 33/1 SD, 431, 1 CC, 33/1 MP; 434/153

[56] References Cited

U.S. PATENT DOCUMENTS

| | | |
|---|---|---|
| 512,882 | 1/1894 | Hillhouse . |
| 1,054,890 | 3/1913 | Alliot ................................. 434/153 |
| 1,110,217 | 9/1914 | Maull . |
| 1,110,901 | 9/1914 | Cowles . |
| 1,170,537 | 2/1916 | Holmes ............................... 33/431 |
| 1,232,290 | 7/1917 | Grunberg . |
| 1,276,657 | 8/1918 | Ibanez . |
| 1,389,293 | 8/1921 | Bridwell . |
| 1,542,079 | 6/1925 | Mulligan . |
| 1,546,928 | 7/1925 | Graham . |
| 1,755,742 | 4/1930 | Mattenklott . |
| 1,921,332 | 8/1933 | Sanwald . |
| 1,930,478 | 10/1933 | Jones . |
| 1,965,337 | 7/1934 | Geyer . |
| 2,210,773 | 8/1940 | Niemeyer ........................... 33/1 SD |
| 2,353,799 | 7/1944 | Ward . |
| 2,411,300 | 11/1946 | Southwell . |
| 2,693,648 | 11/1954 | Anderson ........................... 434/153 |
| 2,789,372 | 4/1957 | Ribak ................................. 434/153 |
| 2,809,447 | 10/1957 | Amsteroam ....................... 434/153 |
| 3,528,077 | 9/1970 | Seiden . |
| 3,643,333 | 2/1972 | Pepper ............................... 33/1 SD |
| 3,690,009 | 9/1972 | Henley, III ....................... 33/1 MP |
| 3,844,041 | 10/1974 | Wilson, Jr. ........................ 33/1 SD |
| 3,983,630 | 10/1976 | Hamm et al. ..................... 33/1 SD |
| 4,176,860 | 12/1979 | Fowler . |
| 4,270,773 | 6/1981 | Gaetano . |
| 4,271,596 | 6/1981 | Ganis . |
| 4,289,333 | 9/1981 | Gaetano ............................ 434/153 |
| 4,360,346 | 11/1982 | Ehsanipour . |
| 4,443,198 | 4/1984 | Ehsanipour . |
| 4,477,254 | 10/1984 | Yokayama . |

FOREIGN PATENT DOCUMENTS

| | | | |
|---|---|---|---|
| 111855 | 10/1968 | Denmark ........................... | 434/153 |
| 2046578 | 3/1972 | Fed. Rep. of Germany ...... | 434/153 |
| 386155 | 1/1933 | United Kingdom ............... | 434/153 |

Primary Examiner—Thomas B. Will
Attorney, Agent, or Firm—Wood, Herron & Evans

[57] ABSTRACT

A geographical location pinpointer comprises a map having a set of spaced indicia located along its periphery, and a locator device including a linearly extending, radial arm and at least one curved arm both of which are movable with respect to the center of the map. Each point of interest on the map is uniquely identified by first and second indicia, and then located by positioning the radial arm and the curved arm at locations corresponding to such indicia so that the two arms intersect over the point of interest. Because the radial arm extends linearly from the center and the curved arm does not, the two arms intersect at only one point for each set of first and second indicia.

18 Claims, 2 Drawing Sheets

GEOGRAPHICAL LOCATION PINPOINTER

FIELD OF THE INVENTION

This invention relates to devices for finding a specific location on a map.

BACKGROUND OF THE INVENTION

Previously known maps are printed on large rectangular sheets of paper that are fanfolded to make them compact for storage. The periphery of the map is typically marked with indicia corresponding to square or rectangular-shaped map regions formed by the intersection of a number of parallel, horizontal grid lines with a number of parallel, vertical grid lines. A legend is often provided on the reverse side of the map that lists points of interest and the indicia identifying the map region containing the points of interest. Such maps are difficult to use for a number of reasons.

Several problems with the use of maps of this type are caused by their folded construction. In many instances the fold lines of the map obscure one or more index indicia located around the periphery of the map, and finding the correct region to locate the selected point of interest using the indicia coordinates is made difficult. Additionally, it is usually necessary to entirely unfold such maps to locate a given point of interest, because the indicia are printed on the map periphery and the location of the map region which contains the point of interest is unknown. Unfolding of the entire map is awkward, particularly in relatively confined areas such as inside an automobile.

Another difficulty with this kind of map is the spacing of the index indicia along the periphery of the map. The horizontal and vertical grid lines drawn across the face of the map are often relatively widely spaced from one another, thus forming large square or rectangular map regions wherein a plurality of points of interest may lie. Identification of a single point of interest within a large map region is burdensome.

One attempt to alleviate the need for searching for a particular point within a square map region is the use of more indicia along the periphery, and therefore more intersecting horizontal and vertical grid lines, to reduce the size of the map regions and the number of points of interest located therein. However, the increased number of grid lines superimposed over the face of the map tends to obscure the features of the map and makes tracing a road or street, or finding a point of interest, difficult and confusing.

SUMMARY OF THE INVENTION

It is therefore among the objectives of this invention to provide a combined map and locator device which is compact in construction and which permits pinpoint location of points of interest thereon without obscuring the map face.

These objectives are accomplished in a geographical pinpointer device which comprises a map having a set of spaced indicia located along its periphery, and a locator device including a linearly extending, radial arm and at least one curved arm both of which are movable with respect to the center of the map. Each point of interest on the map is uniquely identified by first and second indicia, and then located by positioning the radial arm and the curved arm at locations corresponding to such indicia so that the two arms intersect over the point of interest. Because the radial arm extends linearly from the center and the curved arm does not, the two arms intersect at only one point for each set of first and second indicia.

In the preferred embodiment of the present invention, a plurality of circular maps are secured to one another and mounted atop a circular map mounting plate such that only one map may be exposed at a time. The map mounting plate has spaced index indicia located along its circumference. A rotating index plate underlies the map mounting plate and has a rotator tab which extends beyond the circumference of the map plate. The rotator tab holds a portion of the peripheral edge of a transparent sheet which is laid over the face of one of the maps which is exposed and secured in place to locate a point of interest on that particular map. The transparent sheet can then be pulled back away from the map mounting plate to permit the exposure of another map of interest. The rotator tab is marked with an index pointer, e.g., an arrow, on both its top surface which faces the map mounting plate, and its bottom or reverse surface. Preferably, the transparent sheet is inscribed with four curved arms, each of which extend from the center to the peripheral edge of the transparent plate and are spaced equidistantly from one another.

The reverse side of the device has a legend support disc that is fixedly secured to the map mounting plate with the rotating index plate mounted between them. In the presently preferred embodiment, the legend support disc mounts one or more legend sheets, each divided into a number of pie-shaped sectors. Each sector on a legend sheet lists a different point of interest, and is marked with a map identifier and two coordinates or indicia which correspond to the location of the point of interest identified by a given sector. The map identifier comprises a letter or the like which identifies one of the maps carried by the map mounting plate. The two coordinates on each sector comprise an arrow marked on the peripheral edge of the legend sheet within that sector, and the second indicia or coordinate corresponds to an index indicia on the periphery of the map mounting plate.

As described in detail below, in order to locate a point of interest the user first flips the device over and finds the listing on one of the pie-shaped sectors of the legend support plate for the point of interest. The map identifier within that sector identifies the map on which such point of interest can be found. That map segment is exposed by the user, and then the transparent sheet is laid over such map and secured in place. The index plate is then rotated to align the index pointer or arrow on the bottom surface of the rotator tab of the index plate with the indicia arrow, e.g., one of the two coordinates, on the sector of interest. Because the index plate is fixed to an edge of the transparent sheet, the transparent sheet also rotates with the index plate and this positions one of its curved arms at the desired location relative to the exposed map. Finally, the radial arm is pivoted into alignment with the index indicia on the periphery of the map mounting plate which corresponds to the second indicia or coordinate listed on the sector of interest. The radial arm and one of the curved arms intersect at the point of interest identified on the sector.

Among the advantages of this invention is that compact map segments are provided which can be easily manipulated to find a particular point of interest. Additionally, the locations of interest on each map segment are pinpointed by the intersecting radial arm and curved arm which eliminates searching for them within a large block or square map area as had been required with prior maps.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 1A is an enlarged view of the encircled area 1A of FIG. 1, illustrating a portion of the map mounting plate and maps supported thereon;

FIG. 1B is an enlarged view of the encircled area 1B of FIG. 1, illustrating a portion of the legend support disc and the legend sheets supported thereon;

DETAILED DESCRIPTION OF THE INVENTION

Figure 1:
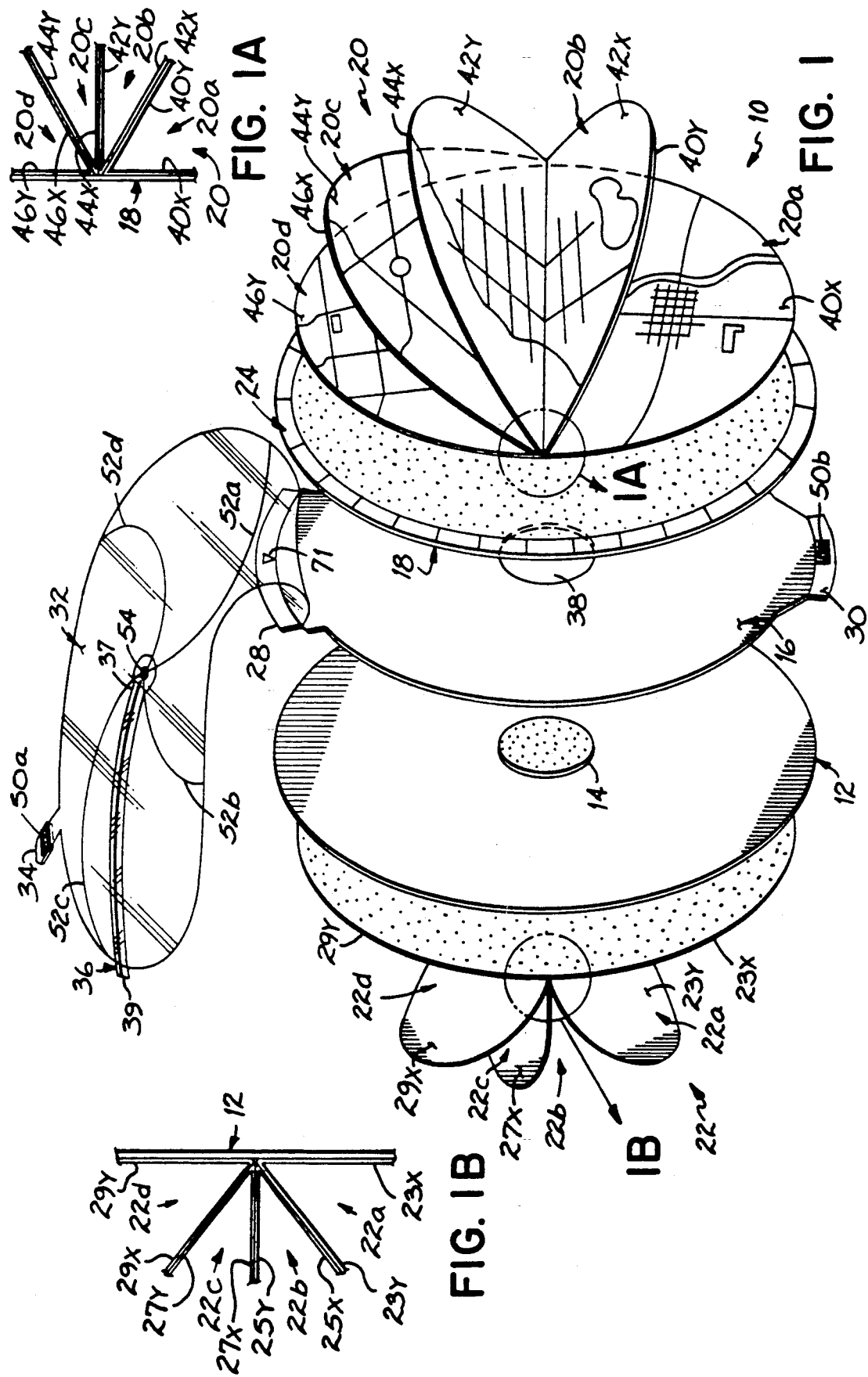
FIG. 1 is a schematic, disassembled perspective view of the preferred embodiment of this invention.

A location pinpointer 10 is shown in FIG. 1. The pinpointer 10 includes a circular legend support disc 12 preferably constructed of a semi-rigid material such as cardboard or the like, although other more rigid or flexible materials may be used. The support disc 12 carries a number of circular folded legend sheets 22, each marked with a number of points of interest, as described below. Located at the center of support disc 12 is a mounting hub 14 extending outwardly therefrom by a distance which is slightly greater than the thickness of a circular index plate 16 having a locator tab 28 and a holding tab 30. The index plate 16 is formed with a mounting hole 38 having a diameter sufficiently large to receive mounting hub 14 so index plate 16 can smoothly rotate about the hub 14. Because mounting hub 14 is slightly longer than the thickness of index plate 16, its free end extends through mounting hole 38. A circular map mounting plate 18 is fixedly attached to this free end of hub 14, such as by adhesive shown at the top of hub 14, thus sandwiching the index plate 16 between the legend support disc 12 and map mounting plate 18. The map mounting plate 18 supports a number of circular, folded maps 20, each bearing different points of interest listed on the legend sheets 22.

In the presently preferred embodiment, a circular transparent sheet 32 is provided for locating different points of interest on the various maps 20, as described below. A portion of the peripheral edge of transparent sheet 32 is attached to the locator tab of index plate 16 so that the transparent sheet 32 can be alternately placed atop one of the maps 20 or pulled back to allow another map 20 to be exposed. As described in more detail below, the transparent sheet 32 is marked with four curved arms 52a, b, c and d, and a radial arm 36 is pivotally mounted at the center of transparent sheet 32.

Figure 3:
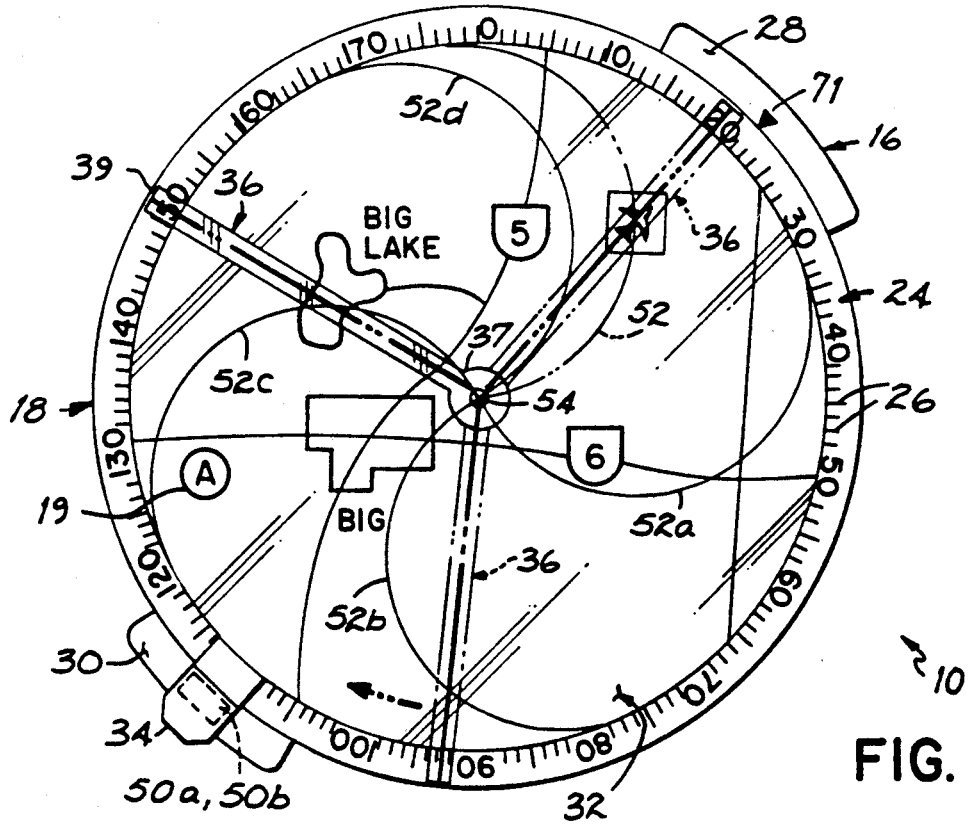
FIG. 3 is a view of one of the curved arms and the radial arm which intersect to locate a representative point of interest.

With reference to the top portion of FIGS. 1, 1A and FIG. 3, the map mounting plate 18 and maps 20 are shown in detail. Mounted to or integrally formed at the peripheral edge of map mounting plate 18 is an index ring 24 having index indicia 26 which preferably mark 180 equal increments along the periphery of map mounting plate 18, although more or less increments may be used. These index indicia 26 are numbered from 0 to 179. The maps 20 carried by map mounting plate 18 have a diameter such that they fit within the inner circumference of index ring 24, thus exposing its indicia 26 for viewing. Each of the maps 20 are marked with a map identifier 19, which, in the preferred embodiment of the invention, is a letter.

The maps 20 are folded upon one another and secured together atop map mounting plate 18 to facilitate use of pinpointer 10, and to reduce its overall size. In the embodiment illustrated in the FIGS., four maps 20a, 20b, 20c and 20d are interconnected and mounted atop the map mounting plate 18. The map 20a is folded in half to form two map segments 40x and 40y. The map segment 40x of map 20a is fixedly attached to the map mounting plate 18 such as by gluing or any other suitable means. When the opposite side of map 20a, i.e., map segment 40y, is folded atop the map mounting plate 18, the entire map 20a is exposed for viewing.

In order to interconnect maps 20a-20d in a compact manner upon the map mounting plate 18, the maps 20a-20d are each folded in half and secured together in a unique manner. As shown in FIG. 1, the underside of map segment 40y of map 20a is fixed to the underside of map segment 42x of the second map 20b. The opposite side or half of map 20b has a map segment 42y which is exposed, along with top surface of map segment 42x thereof, when the map segment 42x is folded over atop the map mounting plate 18. Similarly, the underside of map segment 42y of second map 20b is fixedly attached to the underside of map segment 44x of the third map 20c, whose opposite side or half comprises map segment 44y. Lastly, the fourth map 20d has a map segment 46x connected to the underside of the map segment 44y of third map 20c. The underside of the other half of fourth map 20d, i.e., map segment 46y, is fixedly attached to the map mounting plate 18, opposite the map segment 40a of the first map 20a. This manner of interconnecting maps 20a-20d is extremely compact and permits successive maps 20a-20d to be exposed by folding over map segments onto the map mounting plate 18 and thus exposing only one of the maps 20a-20d at a time.

The legend sheets 22 are mounted to the legend support disc 12, and to one another, in the identical manner as maps 20 as shown at the bottom of FIG. 1 and in FIG. 1B. In the illustrated embodiment, there are four legend sheets 22a, 22b, 22c and 22d each folded in half to form segments 23x, 23y; 25x, 25y; 27x, 27y; and, 29x, 29y, respectively.

Figure 2:
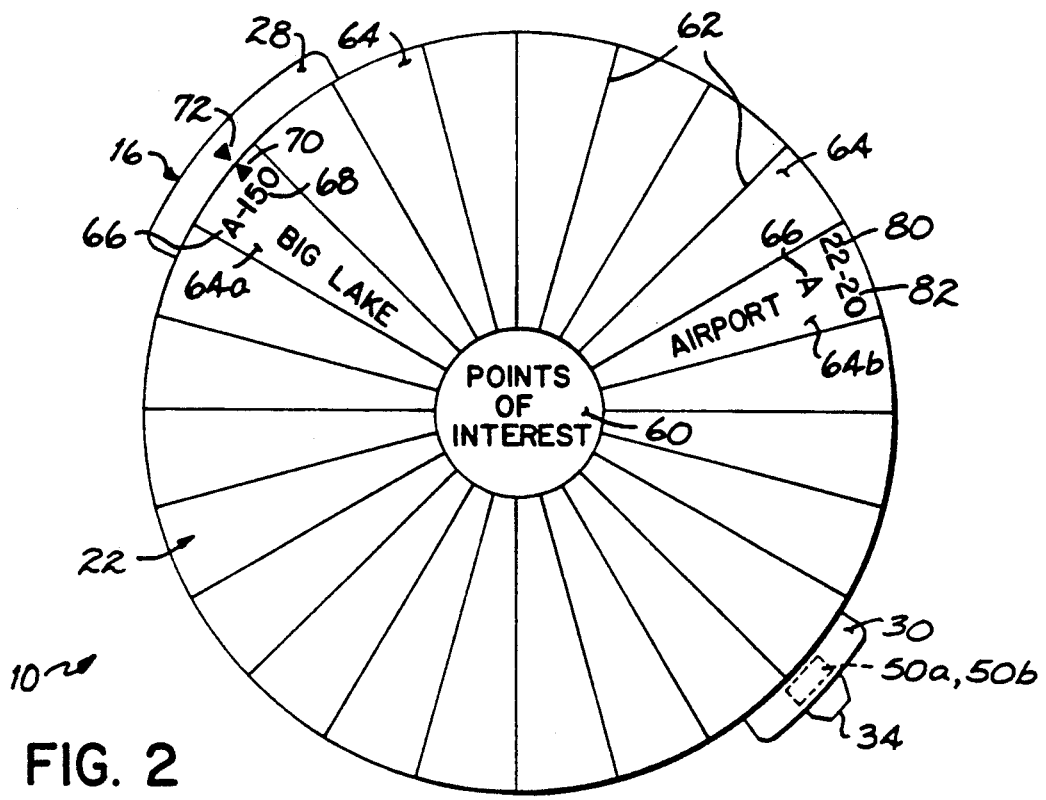
FIG. 2 is a bottom view of the device of FIG. 1 depicting the legend support disc and a legend sheet.

As viewed in FIGS. 1 and 2, the locator tab 28 of rotating index plate 16 is marked with a first index pointer or arrow 71 on the top side, facing map mounting plate 18, and a second index pointer or arrow 72 is formed on the bottom side of locator tab 28 facing the legend support disc 12. When index plate 16 is rotated about mounting hub 14, the locator tab 28 travels along the index ring 24 at the peripheral edge of map mounting plate 18 and along the peripheral edge of a legend sheet 22 carried by the legend support disc 12. Because a portion of the transparent sheet 32 is secured to locator tab 28, the transparent sheet 32 rotates with the index plate 16.

As best shown in FIGS. 1 and 3, transparent sheet 32 has a locking tab 34 extending from its peripheral edge at a location diametrically opposed to the locator tab 28 where it is connected to index plate 16. The locking tab 34 is removably secured to the holding tab 30 of index plate 16 by interlocking fabric hooks and loops commercially available under the trademark VELCRO. The locking tab 34 carries one section 50a of either hooks or loops, and the holding tab 30 carries the mating section 50b of hooks or loops so that the transparent sheet 32 can be secured atop one of the maps 20 to locate a point of interest thereon as described below.

In the presently preferred embodiment, the four curved arms 52a-d inscribed or drawn on the surface of sheet 32 each originate from the center of sheet 32 and extend to its peripheral edge. Preferably, the curved arms 52a-d are semicircles each having a diameter equal to the radius of the circular transparent sheet 32. While the preferred embodiment of the present invention uses four curved arm 52a-d to facilitate operation of device 10, the location of points of interest on the maps 20 in accordance with the teachings of this invention may be accomplished with only one such arm. The radial arm 36 has an inner end 37 mounted by a pivot 54 to sheet 32. The radial arm 36 extends substantially linearly from pivot 54 at the center of transparent sheet 32 to its outer end 39 located just beyond the peripheral edge of sheet 32. As discussed below, the linear, radial arm 32 and non-linear, curved arms 52a-d intersect at only one point regardless of where they are positioned relative to maps 20 and therefore any points of interest on maps 20 can be identified with a single point of intersection of radial arm 32 and one of the curved arms 52a-d.

FIG. 2 shows one of the legend sheets 22 folded flat. At the center of the legend sheet 22 is a legend identifier 60, which, in FIG. 2, identifies that particular legend sheet 22 as one listing points of interest. Extending radially from identifier 60 to the edge of legend sheet 22 are lines 62 that define pie-shaped sectors 64. In one embodiment of this invention, a representative point of interest is shown in one of the sectors 64a of FIG. 2. Within this sector 64a is the name of a geographical location depicted on one of the maps 20, a map identifier 66 and a pair of coordinates which correspond to the location of that geographical location on the appropriate map. The coordinate pair consists of index coordinate 68 corresponding to one of the index indicia 26 on the map mounting plate 18, and a location arrow 70. In an alternative embodiment, described in more detail below, the pie-shaped sectors 64 are marked with one different coordinate. As shown in sector 64b, for example, the location arrow 70 is eliminated and replaced with a second numeric indicia or coordinate 80 which corresponds to one of the index indicia 26 on map mounting plate 18. The sector 64b is therefore marked with a map identifier 66, a first numeric indicia or coordinate 80 and a second numeric indicia or coordinate 82 wherein each of the numeric coordinates 80, 82 correspond to one of the index indicia 26 on the map mounting plate 18.

Operation of Pinpointer

To locate a particular point of interest with pinpointer 10, one of the legend sheets 22 containing the point of interest to be located is selected and folded flat. In one of the illustrated embodiments, the index plate 16 is then rotated so that arrow 72 on its locator tab 28 which faces the legend support disc 22 is aligned with location arrow 70 on the sector 64a. As shown in FIG. 2, sector 64a lists "Big Lake" as the chosen point of interest for purposes of discussion. The user then notes the map identifier 66 appearing on the sector 64a which corresponds to the particular map 20a-20d on which Big Lake can be found, i.e., the letter coordinate "A". At the same time the user identifies the index coordinate 68 from sector 64a, i.e., the number "150", which corresponds to an index indicia 26 on map mounting plate 18. The pinpointer 10 is then flipped over so that maps 20 are facing the user. Transparent sheet 32 is pulled back from the plurality of maps 20a-20d, and the map 20 marked with the letter which matches the legend map identifier 66 is folded flat. In the illustrated example, map 20a marked with the letter "A" is the map containing Big Lake. The transparent sheet 32 is then laid over the exposed map 20a so that the locking tab 34 may be secured within holder 50 as described above.

Pinpointing the geographical point of interest is completed by pivoting radial arm 36 about pivot 54 until its outer end 39 is aligned over the indicia 26 on index ring 24 that corresponds to the index coordinate 68 for the selected point of interest. In the illustrated example, the radial arm 36 is moved to the numeric indicia "150" on the index ring 24 of map mounting plate 18. The intersection of radial arm 36 and one of the curved arms 52, e.g., curved arm 52d, identifies the location of the point of interest that was selected on legend sheet 22, i.e., Big Lake. The user may repeat this sequence for different points of interest to locate with pinpoint accuracy any of the points of interest on any of the maps.

It should be understood from the foregoing discussion of the operation of pinpointer 10 that a two-stage operation is employed in order to locate the radial arm 36 and curved arms 52a-d relative to a given map 20a-20d so that radial arm 36 intersects one of the curved arms 52a-d over the desired point of interest. Because the transparent sheet 32 is connected to the index wheel 16, rotation of the index wheel 16 to align its index arrow 72 with the arrow 70 on sector 64a also rotates the transparent sheet 32. This locates the curved arms 52 with respect to the map 20 beneath so that one of the curved arms 52a-d is positioned at the desired location. The radial arm 36 is then moved in alignment with the numeric indicia 26 on the index ring 24 so that it intersects with one of curved arms 52a-d over the chosen point of interest, i.e., Big Lake in this embodiment.

In the alternative embodiment mentioned above, movement of the index wheel 16 and transparent sheet 32 to properly align the curved arms 52 is accomplished by changing the coordinate system appearing on the sectors 64 on the legend sheets 22. In this embodiment, two numeric indicia 80 and 82 are provided and the location arrow 70 is eliminated, as shown in sector 64b which lists "Airport" as the point of interest. In order to position the curved arms 52 in this embodiment, the first numeric indicia 80 is noted by the user and then the index plate 16 is rotated so that the index arrow 71 marked on the top surface of the locator tab 28 aligns with the corresponding numeric designation 26 on the periphery of map mounting plate 18. This properly positions the transparent sheet 32, and, in turn, the curved arms 52, relative to a particular map 20 of interest. The user then notes the second numeric indicia 82 listed on sector 64b and pivots radial arm 36 until its outer end 39 aligns with the corresponding index indicia 26.

The radial arm 36 and one of the curved arms 52a-d intersect over the "Airport" point of interest.

It is contemplated that the pinpointer 10 of this invention could also be used to locate unlisted geographical locations on maps 20 by employing the numeric coordinate system discussed above in connection with sector 64b. That is, an individual could identify the location of his or her house, for example, with two numeric coordinates, and the user of pinpointer 10 could then employ these coordinates in the manner described above to find the location of the house on one of the maps 20.

While the invention has been described with respect to a preferred embodiment of the invention, it is recognized that the invention can be carried out in other specific ways than those set forth herein and without departing from the scope of the invention. For example, while the maps 20 have been illustrated as being interconnected to facing surfaces of one another, it should be understood that the maps 20 could be bound together at a marginal edge, like a book, so that one map 20 is exposed when two adjacent sheets are folded flat atop the map mounting plate 18. The above embodiment is therefore to be considered in all respects illustrative and not restrictive or limiting of the invention defined by the appended claims.

What is claimed is:

1. A geographical locator device, comprising:
   a map containing geographical points of interest, said map having a center and a peripheral edge;
   a plurality of indicia each spaced from said center of said map and spaced from one another;
   a first arm having an inner end located at said center of said map, and an outer end;
   at least one second arm extending non-linearly from said center of said map toward said peripheral edge thereof;
   means for identifying a first coordinate and a second coordinate which correspond to the location of a distinct geographical point of interest on said map, at least one of said first and second coordinates comprising one of said spaced indicia;
   means for locating said first arm in a position relative to said map which corresponds to one of said first and second coordinates, and means for locating said second arm in a position which corresponds to the other of said first and second coordinates so that said first arm intersects said second arm at a single point over said distinct geographical point of interest on said map.

2. The locator device of claim 1 in which said first arm is substantially linear between said inner and outer ends thereof.

3. The locator device of claim 1 wherein said map is circular and said at least one second arm is semi-circular having a diameter substantially equal to the radius of said circular map.

4. The locator device of claim 1 in which said at least one second arm comprises four semi-circular, curved arms, each of said curved arms being approximately equidistant from one another.

5. The locator device of claim 1 wherein said means for locating said second arm comprises:
   an index plate rotatable about said center of said map; and
   a transparent sheet mounted to said index plate in position atop said map, said transparent sheet carrying said second arm, whereby said index plate and said transparent sheet are rotatable relative to said map to locate said second arm in a position corresponding to one of said first and second coordinates.

6. The locator device of claim 5 in which said map includes a plurality of maps folded atop one another, and said transparent sheet is mounted to said index plate to alternately overlie one of said maps and then be pulled back to permit exposure of another of said maps.

7. The locator device of claim 5 in which said means for locating said first arm comprises a pivot which pivotally connects said inner end of said first arm to the center of said transparent sheet.

8. The device of claim 1 wherein said means for identifying a first coordinate and a second coordinate comprises at least one legend sheet listing points of interest, each of said points of interest being identified by a separate set of first and second coordinates listed on said legend sheet.

9. A geographical locator device, comprising:
   a map mounting plate;
   at least one map mounted to said map mounting plate, said map having a center, a peripheral edge and a center portion extending inwardly from said peripheral edge which contains geographical points of interest;
   a plurality of spaced indicia marked on one of said map mounting plate and said map, said spaced indicia being located at said peripheral edge of said map;
   a legend support disc fixedly mounted to said map mounting plate, said legend support disc carrying at least one legend sheet which lists geographical points of interest and a set of first and second coordinates corresponding to each of said geographical points of interest, at least one of said first and second coordinates of each coordinate set comprising one of said spaced indicia;
   an index plate rotatably mounted between said map mounting plate and said legend support disc;
   a transparent sheet having a center and a peripheral edge, a portion of said peripheral edge of said transparent sheet being mounted to said index plate so that said transparent sheet can be laid atop said at least one map on said map mounting plate and alternately pulled back therefrom;
   a substantially linear arm having an inner end pivotally mounted to said center of said transparent sheet, and an outer end alignable with said spaced indicia;
   at least one substantially non-linear arm fixed to said transparent sheet and extending from said center thereof toward said peripheral edge of said transparent sheet, whereby said first arm is pivoted relative to said map to align said outer end thereof with said one of said first and second coordinates which comprises a spaced indicia, and said index plate and transparent sheet are rotated together to locate said non-linear arm in a position relative to said center portion of said map corresponding to said second coordinate so that said linear arm and nonlinear arm intersect one another at a single point which overlies said geographical point of interest.

10. The locator device of claim 9 in which each of said map mounting plate, map, legend support disc, index plate and transparent sheet is circular.

11. The locator device of claim 10 in which said at least one non-linear arm comprises four semi-circular arms each having a diameter equal to the radius of said transparent sheet, said four semi-circular arms being spaced equidistant from one another on said transparent sheet.

12. The locator device of claim 9 in which said at least one map comprises a plurality of maps folded atop said map mounting plate, each of said maps having an identifier and being selectively positionable underneath said transparent sheet.

13. The locator device of claim 12 in which said plurality of maps comprises:

- a first map having a top surface illustrating geographical points of interest, a bottom surface and opposed first and second halves, said bottom surface of said first map which extends along said first half thereof being fixedly mounted to said map mounting plate so that the second half of said first map may be folded over said first half;
- at least one middle map having top and bottom surfaces and opposed first and second halves, said first half of said middle map being fixedly mounted to the bottom of said second half of said first map so that said middle map is visible when said second half of said first map is folded over; and
- a last map having top and bottom surfaces and opposed first and second halves, said first half of said last map being fixedly mounted to said bottom surface of said second map along said middle half thereof and said second half of said last map being fixedly mounted to said map mounting plate so that folding over said middle map exposes said last map.

14. The locator device of claim 12 in which said plurality of legend sheets comprises:

- a first legend sheet having a top surface listing different points of interest, a bottom surface and opposed first and second halves, said bottom surface of said first legend sheet along said first half thereof being fixedly mounted to said legend support disc so that the second half of said first legend sheet may be folded over said first half;
- at least one middle legend sheet having top and bottom surfaces and opposed first and second halves, said first half of said middle legend sheet being fixedly mounted to the bottom of said second half of said first legend sheet so that said middle legend sheet is visible when said second half of said first legend sheet is folded over; and
- a last legend sheet having top and bottom surfaces and opposed first and second halves, said first half of said last legend sheet being fixedly mounted to said bottom surface of said middle legend sheet along said second half thereof and said second half of said last legend sheet being fixedly mounted to said legend support disc so that folding over said middle legend sheet exposes said last legend sheet.

15. The locator device of claim 12 in which said legend sheet is marked with a map identifier associated with each point of interest corresponding to said identifier of one of said maps.

16. The locator device of claim 9 in which said first coordinate and said second coordinate each comprise one of said spaced indicia, said index plate including a tab marked with an arrow which is alignable with said spaced indicia at said peripheral edge of said map so that said non-linear arm can be located in a predetermined position relative to said map by rotating said index plate and aligning said arrow on said tab thereof with one of said spaced indicia.

17. The locator device of claim 9 in which said first coordinate is one of said spaced indicia and said second coordinate is a locator arrow marked on said legend sheet, said index plate including a tab having an index arrow which is alignable with said locator arrow on said legend sheet so that said non-linear arm can be located in a predetermined position relative to said map obtained by rotating said index plate and aligning said index arrow on said index plate tab with said locator arrow on said legend sheet.

18. The locator device of claim 9 in which said legend sheet is divided into a number of sectors each listing a different geographical point of interest and each being marked with a different set of first and second coordinates.

* * * * *